United States Patent [19]
Fowell

[11] Patent Number: 6,135,389
[45] Date of Patent: Oct. 24, 2000

[54] SUBTERRANEAN TARGET STEERING STRATEGY

[75] Inventor: Richard A. Fowell, Culver City, Calif.

[73] Assignee: Hughes Electronics Corporation, El Segundo, Calif.

[21] Appl. No.: 09/039,883

[22] Filed: Mar. 16, 1998

[51] Int. Cl.⁷ .................................................. B64G 1/00
[52] U.S. Cl. ...................................................... 244/158 R
[58] Field of Search ............................... 244/158 R, 164; 342/22, 355

[56] References Cited

U.S. PATENT DOCUMENTS

| | | |
|---|---|---|
| 3,836,969 | 9/1974 | Bond et al. . |
| 4,776,540 | 10/1988 | Westerlund . |
| 4,911,385 | 3/1990 | Agrawal et al. . |
| 4,943,808 | 7/1990 | Dulck et al. . |
| 5,100,084 | 3/1992 | Rahn et al. . |
| 5,184,790 | 2/1993 | Fowell . |
| 5,703,594 | 12/1997 | Anderson . |

OTHER PUBLICATIONS

"Lost City of Ubar" Jul. 28, 1994. Accessed Website on Nov. 18, 1999. Website: http://www.jpl.nasa.gov/radar/sircxsar/ubar.html.

"Seeing Under the Sand" 1998. Accessed Website on Nov. 18, 1999. Website: http://www.letsfindout.com/subjects/space/sarsahra.html.

Hall, Alan. "Slices of the Past." Jun. 22, 1998. Accessed Website on Nov. 18, 1999. Website: http://www.scientificamerican.com/exhibit/062298radar/index.html.

"The Sky's Eyes: Remote Sensing in Archaeology" NOVA Online, Lost City of Arabia/High–Tech Tools (Jun. 1, 2000), pp. 1–6.

Surveillance Satellite System Study Results, vol. 2: Alternate Surveillance Satellite System, Arvydas Vaisnys, Editor, Apr. 15, 1985, prepared for U.S. Dept of Transportation Federal Aviation Administration through an agreement with NASA by JPL, California Institute of Technology, Pasadena, CA.

ATS–6 program documentation, I. Clay Thompson, Jr.

"Goes I–M Image Navigation and Registration System," A.A. Kamel & M.K.P. Bhat, Twenty–First Int'l Symposium on Remote Sensing of Environment, Ann Arbor, MI, Oct. 26–30, 1987, pp 561–575.

"Optimum Antenna Beam Pointing for Communication Satellites," J.E. Keigler & L. Muhlfedler, pp 70–78.

"On Antenna Pointing Control for Communications Satellite," Y.P. Loh, pp 976–986.

"Design of a Manueverable Momentum Bias Attitude Control System," K. Lebsock & J. Eterno, pp 704–713.

"Three–Axis Attitude Control for a Geostationary Satellite," H.R. Freeman, 7ᵗʰ IFAC Symposium on Automatic Control in Space, Rottach–Egern, W. Germany, May 1976, pp 69–83.

"Longitude–Reuse Plan Doubles Communication Satellite Capacity of Geostationary Arc," D. Wadsworth, pp 198–204.

(List continued on next page.)

*Primary Examiner*—Peter M. Poon
*Assistant Examiner*—Tien Dinh
*Attorney, Agent, or Firm*—T. Gudmestad; M. Sales

[57] ABSTRACT

A method for steering the payload beam of a satellite in a non-geostationary orbit toward an intended service area having known geographical dimensions in order to obtain improved pointing performance with a corresponding reduction in the demand on onboard hardware and software systems. The method comprises the steps of determining a subterranean target point and a direction fixed in the payload beam, calculating the orientation that points the payload beam direction through the subterranean target point, and maintaining this payload beam orientation using an on-board attitude control system.

16 Claims, 4 Drawing Sheets

OTHER PUBLICATIONS

"Factors Influencing the Choice of an Orbital Propulsion System for Geostationary Satellites," G. Boersma & F.J. Sonnenschein, Nat'l Aerospace Laboratory NLR, pp 1–2, 13–18.

"A Phase II Satellite for the Defense Satellite Communications System," A.T. Finney, AIAA $3^{rd}$ Communications Satellite Systems Conference, Los Angeles, CA, Apr. 6–8, 1970, pp 1–6.

"ATS–6 Spacecraft Design/Performance," W.N. Redisch & R.L. Hall, EASCON '74, pp 44–44G.

"Evolution of an Attitude Control System for Body–Stabilized Communication Spacecraft," L. Muhlfelder, pp 108–112, AIAA Guidance and Control Conf, Seattle, WA, Aug. 20–22, 1984.

"A Design for INSAT," P.P. Kale, R.L. Nickelson & F.W. Sarles, Jr., pp 1–18, AIAA $4^{th}$ Communications Satellite Systems Conf, Washington, D.C., AIAA Paper No. 72–576, Apr. 24–26, 1972.

"Attitude Control Requirements for Future Communication Satellites," U. Renner, Automatic Control in Space, vol. 1: Invited Papers, pp 161–182, 1976.

SUBTERRANEAN TARGET STEERING STRATEGY

BACKGROUND OF THE INVENTION

1. Field of the Invention

The present invention relates to a method for steering a payload beam of a satellite towards an intended service region in a manner which improves payload beam coverage over the intended service area in the presence of non-geostationary orbit effects while retaining simple steering logic.

2. Background of the Invention

Payload performance for many spacecraft, such as communication satellites, is often enhanced if there is no relative motion between the payload beam and the intended service region. If the intended service region is a fixed region on the ground, this can be achieved if the satellite position remains fixed with respect to the revolving earth.

This can be accomplished by placing the satellite in a "geostationary" orbit. The benefits of geostationary orbits are such that there are scores of satellites currently in geostationary orbits, and the techniques for operating satellites in geostationary orbit are well known in the art.

A geostationary orbit is a circular orbit that lies in the plane of the Equator, with an orbit period equal to the Earth's rotation period, and an easterly orbit velocity. In technical terms, a geostationary orbit is a prograde orbit with zero eccentricity, zero inclination, a period of one sidereal day (approximately 86,164.0907 seconds) and a semimajor axis of 42164.172 km.

Ideally, a satellite in a geostationary orbit stays directly above a point with fixed longitude and zero latitude (the equator). Practically, satellites are termed geostationary satellites if they remain substantially geostationary. The allowable deviation depends on context, but commercial "geostationary" communications satellites are typically designed to stay within 0.1 degrees in latitude and longitude of their assigned station.

The price of staying in geostationary orbit is that a satellite in geostationary orbit is constantly being pulled away from that orbit by environmental forces that must be countered if the satellite is to remain in geostationary orbit. Gravitational accelerations due to the moon, the sun, and the nonuniform earth all work to introduce orbit inclination, drift, and eccentricity. Geostationary satellites must therefore allocate much of their launch weight to propellant rather than payload, and when that propellant is exhausted, the benefits of geostationary orbit no longer obtain. The largest amount of propellant must be expended to resist the tendency of the sun and moon to increase the orbit inclination.

These costs are well known, and so many satellites are operated in geosynchronous orbits rather than geostationary orbits. Broadly, a geosynchronous orbit is an orbit that has the same period as the earth's rotation, but may have nonzero eccentricity and inclination. By this definition, a geostationary orbit is a geosynchronous orbit, but the term "geosynchronous" is sometimes used to distinguish from "geostationary". In this work, the tern "geosynchronous" shall be used to refer to orbits whose period is substantially that of the rotation of the earth, but which exhibit variations of more than 0.25 deg in latitude or longitude.

The consequences of geosynchronous operation is relative motion of the satellite relative to earth-fixed points. For points in the service region, the azimuth, elevation, range, range rate, and angle above the horizon of the satellite now vary. These have consequences on payload performance. For example, for communications satellites, these effects cause ground antenna gain losses due to azimuth and elevation variation, variations in equivalent isotropic received power (EIRP) due to range variation, frequency variations due to Doppler effects of range rate, and variations in EIRP due to atmospheric attenuation variations with horizon angle.

Due to the payload consequences for non-geostationary satellites, there is interest in keeping the orbit close to geostationary, and many geosynchronous satellites are kept within a latitude range of plus or minus six degrees in service, and within a longitude range of plus or minus 0.1 degrees at the equatorial plane crossing. Such satellites have been variously termed "nearly geostationary", "quasi-stationary", "passively controlled geosynchronous", "low inclination geosynchronous", "slightly inclined" or "inclined geosynchronous" orbits. Typically, the orbit period, eccentricity and true anomaly are controlled to some degree by "east-west station keeping" or "drift and eccentricity" maneuvers, but the orbit inclination control is limited or non-existent. This type of control is sometimes called "free inclination drift", or a "free-drift strategy".

For non-geostationary satellites, the apparent angle between points in the intended service region and attitude determination references (such as a beacon site located in the service region, the earth center, the sun or the fixed stars) now varies from the same angle seen by a satellite in geostationary orbit. This will cause variations in pointing of the payload beam relative to the service region unless accounted for by some form of attitude control steering of the payload beam. Such pointing variations can cause the payload beam to deviate sufficiently from the intended service region that coverage of the intended service region is insufficient, or unacceptable intrusion and interference in other regions occurs.

If attitude steering is not provided for the effects of the non-geostationary orbit, the pointing variations are typically least when the attitude determination reference is a beacon site in the service region, and greatest when the attitude determination reference is the sun or stars. This is because the parallax effects between points in the service region and an attitude reference point are, all other things being equal, larger the further the point in the service region is from the attitude reference point. Note that, since the effects of parallax will be different for different points in the service region, attitude steering of the payload beam can reduce, but cannot totally eliminate the pointing variations over the entire service region. If the residual effects are to be reduced further, techniques such as reshaping the payload beam should be considered.

The desirability of correcting the attitude of the payload beam for non-geostationary orbit effects is well known, and many techniques have been developed for such correction.

One technique is Beacon-Target pointing, which points the satellite at a radio-frequency beacon in the intended service region. While this is a useful technique, by reason of the reduced parallax discussed above boresight pointing at a surface point will not correct the adverse effect of an inclined orbit as well as pointing at a subterranean point, as will be demonstrated later. The effectiveness of this approach is further hampered by the economic, political and physical constraints that may preclude placing a radio beacon at the geographically ideal surface location. Moreover, the ground beacon approach suffers from the added costs and constraints of building and maintaining a ground station, and is vulnerable to periodic beacon outages or failures.

Another approach is to use what may be characterized as Generalized Offset Function pointing. Many forms of offset functions have been employed, such as sinusoidal correction (sinusoidal earth sensor roll offset and yaw momentum commands, updated for inclination changes), Fourier series, on board correction tables (daily consultation of a 128 point table for offset of pitch, roll and yaw momentum, relying on the earth's infrared horizon as a pointing reference), as well as other methods. A more detailed explanation can be found in U.S. Pat. No. 5,100,084. These approaches typically require an extensive amount of ground interaction to keep the steering method up to date, and also require a great deal of on board processing which taxes the on board hardware and software systems of the spacecraft. Another well established method is Ephemeris based pointing. Ephemeris based pointing has been used to keep the payload boresight pointed at a desired surface target point despite non-geostationary orbit effects. This technique and use is well-known (e.g., the Redisch and Hall paper from EASCON '74, and the Lebsock paper AIAA 88-4308-CP). In Ephemeris based pointing, the commanded payload attitude is calculated by knowledge of the satellite position and the position of the target point. From this information, the desired payload beam attitude is calculated and the satellite attitude control system implements it. The satellite position knowledge is typically computed by an on-board model of the orbit, and the model parameters are typically updated periodically from the ground. In the examples above, the target point was a surface point, so the commanded attitude profile was the same as would be produced by Beacon-Target pointing. As noted above, this attitude profile is generally not as good as that produced by a subterranean target point. The deficiencies of this approach were recognized in the Loh paper AIAA 92-1940-CP, which proposed to improve the compensation of orbit inclination effects by averaging the commanded attitudes obtained by pointing at two or more surface points. Such an approach may experience less pointing error than approaches using a single target point, but unfortunately involves more intensive computations, thus taxing on board hardware and software systems. Such an approach is also more complicated to reprogram from the ground or communicate to operators or designers than a single point target method.

Consequently, there exists a need for an improved strategy for steering satellites in non-geostationary orbits which improves pointing performance and ground coverage and which is less taxing to the on board hardware and software systems. Ideally, such an improved steering strategy should be less computationally intensive and easier to re-program from the ground than existing steering strategies.

SUMMARY OF THE INVENTION

The present invention is an improved approach to ephemeris based target steering that uses a subterranean target. This provides improved compensation for non-geostationary orbit pointing effects over the prior art surface target steering, while being easier to reprogram from the ground and less taxing on onboard hardware and software systems than the prior art multiple surface target steering. An exemplary use of this invention is to target the payload beam of a satellite in a slightly inclined geosynchronous orbit towards an intended service area having known geographical dimensions, comprising the steps of determining a subterranean target point, then using an ephemeris based satellite attitude control system to maintain the boresight of the payload beam through the subterranean target point. Techniques for implementing an ephemeris based satellite attitude control system, and using such a system to point a satellite vector at a target point, are well known in the art. Typically, the payload beam will include a boresight, and the orbit inclination and consequent northern and southern orbit extremes will be known. A first approximation to the subterranean target point is obtained by finding the point of closest approach between the payload boresight lines computed for two cases. The first boresight line is that for the satellite placed at the northern extreme of the orbit, with the payload oriented in the attitude that optimizes an exemplary payload pointing metric for this location. The second boresight line is that for the satellite placed at the southern extreme of the orbit, with the payload oriented in the attitude that optimizes an exemplary payload pointing metric for this southern location. If these two boresight lines intersect, the point of intersection is the subterranean target point. If they do not intersect, then the point of each line which is closest to the other line is found, and the point midway between these two points is the subterranean target point.

The subterranean target point location can be refined by well-known numerical optimization techniques. A preferred process would be to take additional points around the orbit, and calculate the payload pointing metric for pointing at the nominal target point and for perturbed target locations in three orthogonal directions. Based on the payload pointing metric at the nominal and perturbed target locations, the target point would be repeatedly adjusted until an optimum target location for the payload pointing metric was found. In technical terms, the free parameters for optimization would be the Cartesian coordinates of the subterranean point, and the objective function would be the payload pointing metric evaluated at the multiple orbit points, given that the satellite attitude at the multiple orbit points was that determined by the subterranean steering law for the current subterranean target point.

According to another aspect of the invention, a method for steering the payload beam of a satellite in a non-geostationary earth orbit toward an intended service area having known geographical dimensions, comprises the steps of determining the position of a subterranean target point that is distinct from the earth center, selecting a target vector fixed in the payload pattern, determining the satellite position, directing the target vector toward the target point, and maintaining the target vector pointing toward the target point using an on-board attitude control system.

DETAILED DESCRIPTION OF THE INVENTION

The embodiment described herein is not intended to limit the scope of the invention to the precise form disclosed, but rather is intended to best illustrate the principles of the invention so that others may follow its teachings.

Referring now to the drawings, a satellite 12 having an ephemeris based on-board satellite control system (ACS) of the type commonly employed in the art is shown in an inclined geosynchronous orbit 14 about the earth 8, in which the satellite 12 moves along a portion of an orbital path 13 relative to the surface of the earth 8. To facilitate comparison with the prior art, reference may be had to the disclosure of U.S. Pat. No. 4,776,540 issued to Westerlund, the disclosure of which is incorporated herein by reference. Also, reference may be had to U.S. Pat. No. 5,184,790 issued to Fowell, the disclosure of which is also incorporated herein by reference.

To facilitate the explanation of the method described herein, the earth cross-section will be designated by the reference numeral 10, while the earth spin axis will referred to by the numeral 20, the earth equatorial plane by the numeral 30 and the earth center by the numeral 40. The north pole 50 and the south pole 52 lie along the spin axis 20. The Earth 8 will be approximated as a sphere having a radius Re that will be approximated as precisely 6378 kilometers (km), while the orbit 14 will be approximated as a circle having an orbital radius $O_r$ (the distance from the earth center 40 to the mean satellite location 120 in orbit 14) that will approximated as precisely 6.61 times greater than $R_e$. Further, the satellite 12 has an orbital period that will be approximated as that of the earth's rotation.

Figure 2:
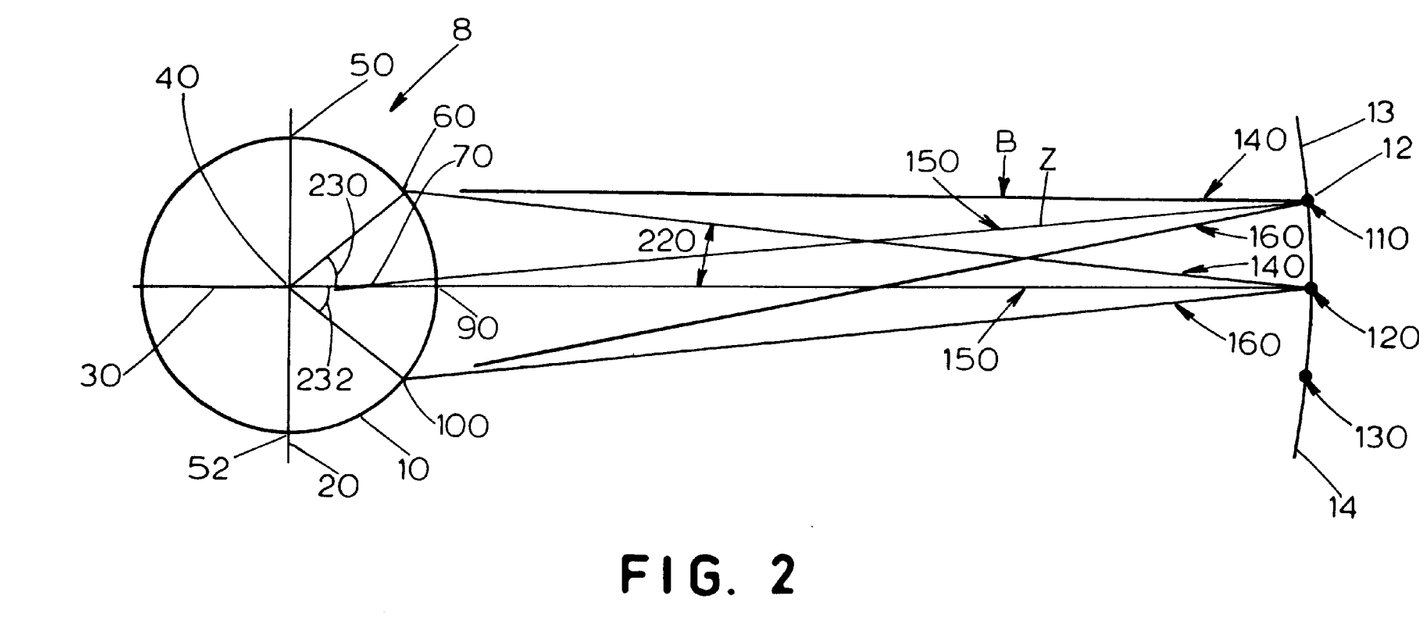
FIG. 2 is an enlarged view, not to scale, of a satellite in orbital rotation about the earth; the derivation of the optimum subterranean target point is graphically depicted.

The satellite 12 has an intended service area (ISA) having a northern region extreme 60 lying at precisely forty degrees north latitude, a southern region extreme 100 lying at precisely forty degrees south latitude, and a center 90 lying in the earth's equatorial plane 30. The northern region extreme lies at a latitude 230, while the southern service extreme lies at a latitude 232 as shown in FIG. 2. The satellite 12 moves through the orbit between a northern orbit extreme 110, a southern orbit extreme 130, and an orbital mean 120. For purposes of the example, the orbital mean 120 lies in the earth's equatorial plane 30. The satellite 12 has a payload beam B, which for purposes of the example is assumed to be a cone having a half-angle 220, centered on a payload boresight 150 (coaxial with the Z or yaw axis of the satellite 12), which points to the center 90 of the ISA when the satellite 12 at its mean location 120. The value of the half-angle 220 is chosen to be the angle between the earth center 40 and the and the northern service extreme 60 viewed with the satellite 12 at the orbital mean 120. The payload beam B has a northern payload extreme 140 and a southern payload extreme 160, bisected by the boresight 150.

Figure 3:
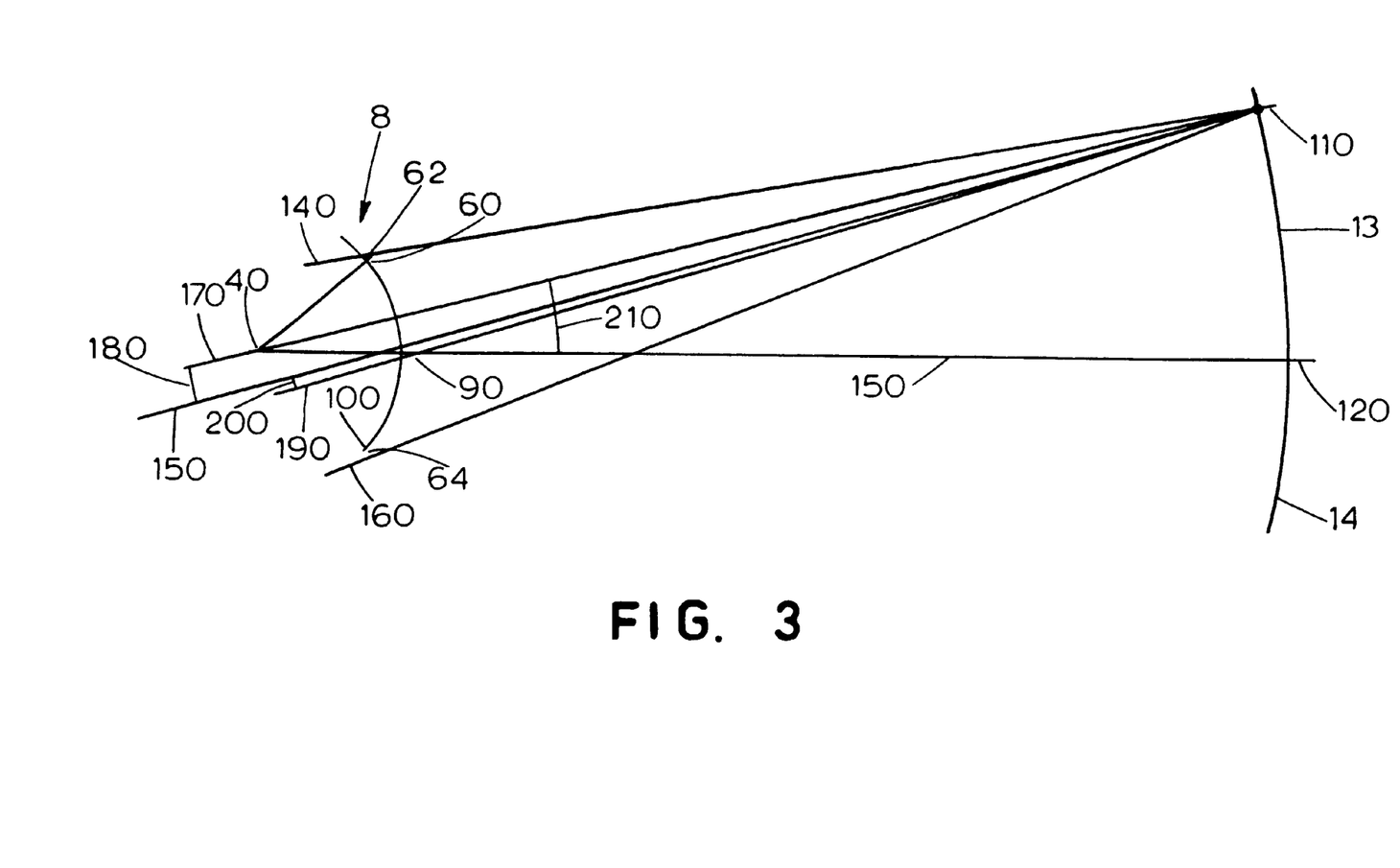
FIG. 3 is an enlarged view, not to scale, similar to FIG. 2, and also illustrating the offset pointing angle derivation.

As shown in FIG. 3, the north/south angular displacement between the northern payload extreme 140 and the northern service extreme 60 is termed the north error 62, which can be seen in FIG. 3 as the difference between the location where the northern payload extreme 140 strikes the earth 8 and the location of the northern service extreme 60. Similarly, the north/south angular displacement between the southern payload extreme 160 and the southern service extreme 100 is termed the south error 64, which can be seen in FIG. 3 as the difference between the location where the southern payload extreme 160 strikes the earth 8 and the location of the southern region extreme 100. As the satellite 12 moves through its orbit 14 along the path 13, the values for each of the north error 62 and the south error 64 will vary.

The orbit inclination angle 210 is the angle subtended between the northern orbit extreme 110 and the mean orbital location 120 as viewed from the earth center 40. For purposes of the illustrative example, an inclination angle of five degrees will be used, which will facilitate comparison with the results obtained by the more complex methods employed by '540 and '790 references mentioned above.

As is well known in the art, the apparent motion of the satellite 12 viewed from a location on the ground is the well known "figure eight" pattern, with the extremes of the apparent "figure eight" being defined by the northern orbit extreme 110 and the southern orbit extreme 130. The object of the payload pointing metric described herein is to minimize the maximum north and south errors 62, 64. Such a payload pointing metric is typically termed a "minimax" criterion. In practice, the steering metric may be based on optimizing such payload metrics as equivalent isotropic radiated power (EIRP), antenna directivity, and beam motion rate, all of which are well known to those skilled in the art and thus no further description will provided herein. In order to minimize the north and south errors 62, 64, described above, a subterranean target point 70 will be chosen, the derivation of which will be described in greater detail below.

Figure 1:
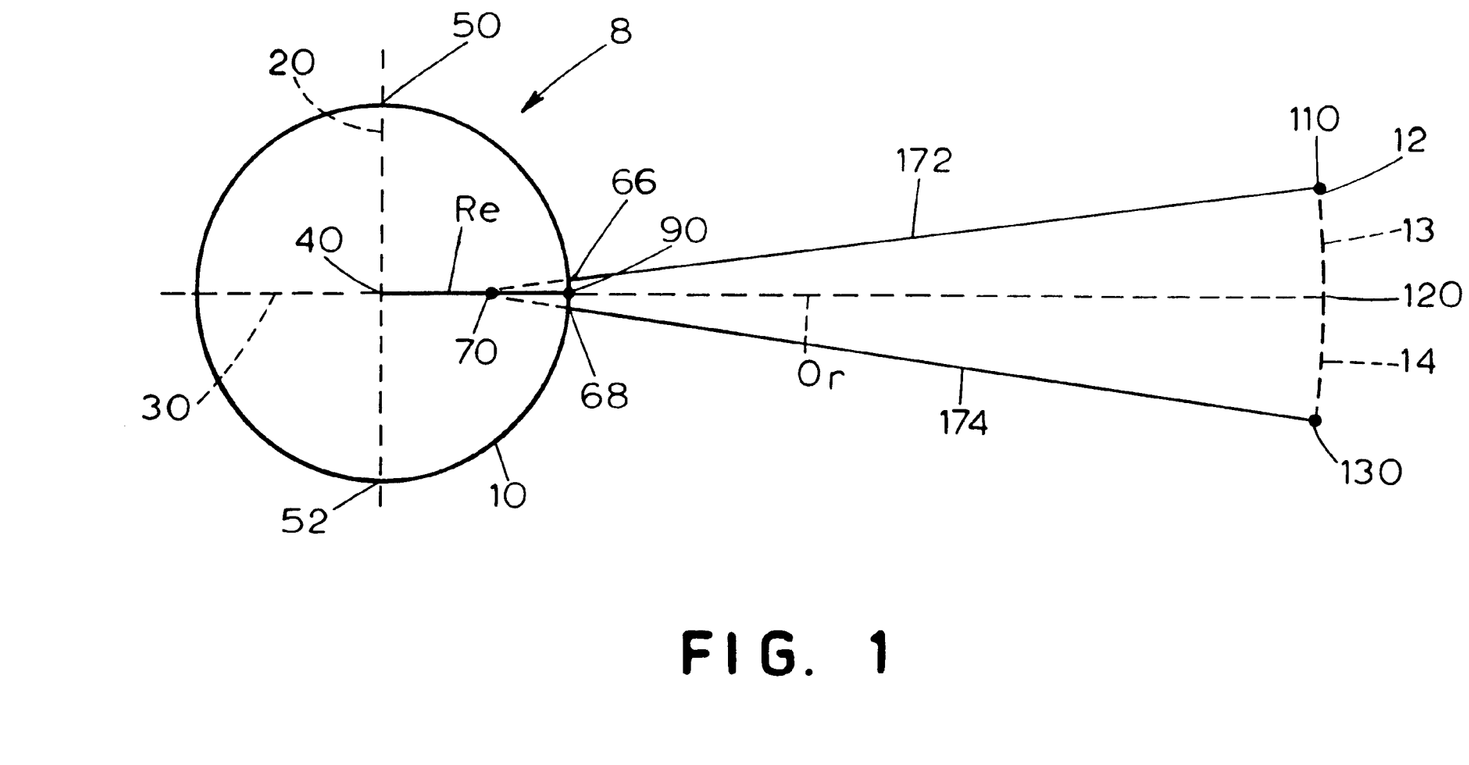
FIG. 1 is a graphical representation of a satellite in a generally geosynchronous orbit in rotation about the earth.

The location of the subterranean target point 70 is derived as follows. As can be seen in FIG. 1, for a given orbit the satellite Z axis (coaxial with the boresight 150) strikes the earth surface at its most northern point 66 when the satellite 12 is in the desired payload attitude at the northern orbit extreme 110, and similarly strikes its most southern point 68 when the satellite 12 is in the desired payload attitude at the southern orbit extreme 130. Even at the scale of FIG. 1, points 66 and 68 are visibly displaced. If a line 172 extending from the satellite 12 through point 66 is extended to intersect a line 174 extending from the satellite 12 through point 68, these two lines 172 and 174 will intersect at a point below the surface of the earth 8. This subterranean point is then chosen as the subterranean target point 70. The on-board ACS, using ephemeris and ground beacons, star sensors, or other known methods is then programmed to point the boresight 150 at the subterranean target point 70.

Figure 4:
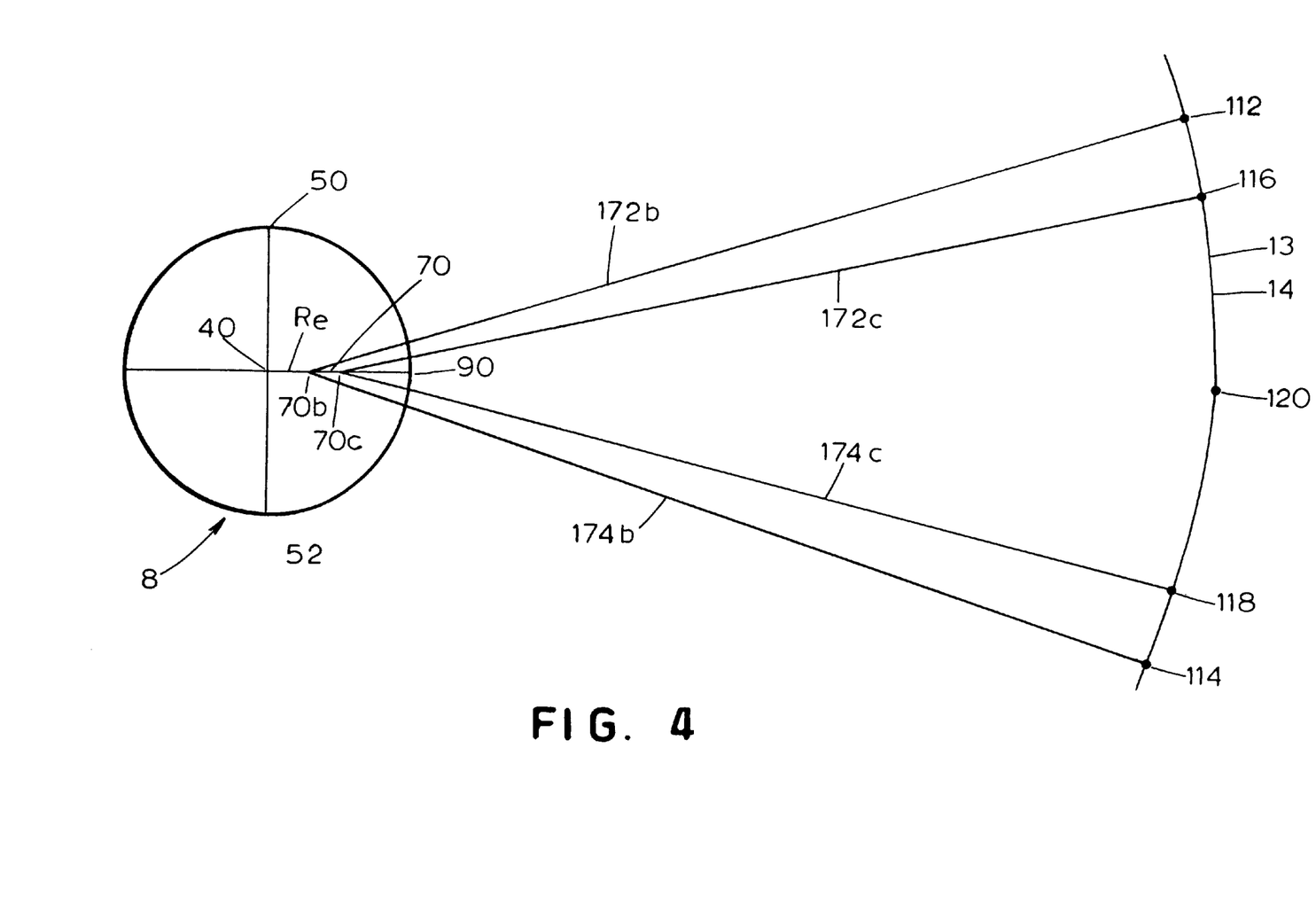
FIG. 4 is an enlarged view, not to scale, similar to FIG. 2, and graphically illustrating the derivation of additional subterranean target points.

FIG. 4, which is not to scale, graphically illustrates the manner by which additional subterranean target points may be chosen. The process can be repeated using the desired payload attitude at a number of known satellite positions thereby calculating a number of target points (70b, 70c, . . . 70n), by simply calculating the subterranean points at which the lines 172b, 172c, . . . 172n intersect lines 174b, 174c, . . . 174n. FIG. 4 shows two pairs of known orbit locations 112, 114, 116 and 118 in an exaggerated scale (which would correspond to a greatly exaggerated inclination angle). Using the methodology described above, in the event the center 90 of the ISA lies in the equatorial plane 30 and assuming an inclination angle 210 of five degrees, the optimum subterranean target point 70 will be located at a radius of 4437.275 km. Accordingly, the boresight 150 is pointed at the subterranean target point 70 and the proper satellite attitude is maintained using the onboard ACS.

QUANTITATIVE EXAMPLE

For purposes of comparison, it is helpful to compare the performance of the subterranean target point methodology. FIG. 3 is a graphical comparison of the present invention to the methodology and results of the Westerlund '540 patent. A line between the satellite 12 at its northern orbit extreme 110 and the earth center 40 is represented by the reference line 170. Line 190 represents a line from the satellite 12 to the center 90 of the ISA. The angle 200 is subtended between lines 150 and 190. The Westerlund '540 patent gives formulas for the appropriate offset pointing angle 180 (represented below by Beta), which is the angle between line 170 and the boresight 150 (which intersects the subterranean target point 70 chosen using the methodology described above and thus is at a known location). The Westerlund reference gives formulas for the appropriate offset pointing angle 180 of the boresight 150 relative to the line 170 from the satellite 12 to the earth center 40 in order to zero either the north error 62 or the south error 64, wherein:
β=the offset pointing angle 180
bs=the latitude 230 (In our example, 40 degrees for point 60, −40 degrees for point 100)
I=the inclination angle 210
6.61=the ratio of the satellite orbit radius to the radius of the point being tracked.
BS=the elevation angle 220 (tan$^{-1}$[sub(bs)/(6.61−cos(bs))]

Thus, Westerlund gives the appropriate offset angle for this example to zero the north error 62 when the satellite 12 is in its northern extreme 110 as:

$$\beta = BS - \tan^{-1}\{\sin(bs-I)/[6.61-\cos(bs-I)]\}$$

Similarly, to zero the south error 64 when the satellite 12 is in its southern extreme 130:

$$\beta = |(-BS - \tan^{-1}\{\sin(bs+I)/[6.61-\cos(bs+I)]\})|$$

Using the above, the appropriate values for the offset angle 180 can be calculated to four decimal places at the northern service extreme 60, the southern service extreme 100, and to track the surface point 90. Using a value of bs=0, and a ratio of satellite orbit radius to target radius of (6.61*6378)/4437.275=9.501, the values were computed and tabulated as shown below:

TABLE 1

Calculation of β

| Location | Latitude in degrees (bs) | Orbit radius/radis of Location | β at North Orbit Extreme | β at South Orbit Extreme |
|---|---|---|---|---|
| Northern Region Extreme 60 | 40 | 6.61 | 0.6202 | 0.5541 |
| South Region Extreme 100 | −40 | 6.61 | 0.5541 | 0.6202 |
| Two Point Nodding | | | 0.5871 | 0.5871 |
| Subterranean target Point 70 | 0 | 9.501 | 0.5871 | 0.5871 |
| Center of the Service Region 90 | 0 | 6.61 | 0.8895 | 0.8895 |

Values for Beta are presented for the two points in the orbit where the tracking metric will be worst.

TABLE 2

Tracking Error Metric Scores

| Steering Law | Tracking error metric (degrees) |
|---|---|
| Two Point Nodding | 0.0331 |
| Subterranean Target | 0.0331 |
| Boresight Surface Target | 0.3354 |

As is evident from Table II, the tracking error metric for the present subterranean target method is comparable to that of the much more complicated "two point nodding" method, and superior to the center of the service region method.

This simple example is intended only to be illustrative of the merits of the current invention. In most cases, the geometry and the objective function will be more complex.

The current invention was evaluated for a circular geosynchronous orbit inclined at 5.2 degrees for an irregular service area centered in the Northern hemisphere, to be covered by 230 spot beams. Two payload pointing metrics were considered: (1) minimizing the maximum apparent motion of all 230 beams, and (2) minimizing the maximum apparent motion only at the 72 beams on the periphery of the pattern. A subterranean target was determined for each metric by numeric optimization of the target coordinates based on evaluation of the pointing metric for 24 points around the orbit. The results were compared with the result obtained when the attitude at each point was allowed to be selected to optimize the metric without constraints. Due to the parallax across the extended area, even the optimum unconstrained payload attitude gave an error of 0.3209 degrees for the first metric and 0.3005 degrees for the second metric. The increased error in the metrics for steering to a single subterranean target point rather than the optimal attitude at each of the 24 locations was 0.0007 degrees for the first metric, and 0.0004 degrees for the second metric. The increased error for using the simple subterranean target strategy here is less than 1 part in 400—a good cost-benefit trade. The bulk of the error here was parallax error that could not be corrected by attitude control of the payload as a whole, and would be compensated by individual electronic steering of the spot beams to correct the residual error. Since this electronic steering was to be superimposed on top of the target steering, the simplicity of the target steering law was an important benefit in communicating between the attitude control group and the payload group. It was also deemed an advantage of this steering scheme that the commanded attitude of the payload was only a function of the satellite latitude, longitude and radius. This allows the payload area to understand the behavior of the underlying target steering law through the changes in orbit inclination, right ascension of ascending node, drift rate and eccentricity which will take place over the satellite lifetime.

The two payload pointing metrics used above are still simplistic. A preferred embodiment for the payload pointing metric is that the metric be based on payload performance characteristics and requirements, such as gain slope at edge of coverage, required EIRP for various points, allowable beam motion rate, and the like. This allows the target point to be optimized to meet the payload requirements. Note that the appropriate metrics can be expected to vary with the type of payload, the customer, and other factors.

By itself, the requirement to point a vector fixed in the payload pattern through the subterranean target point leaves open the question of possible rotation of the payload about that line. A preferred embodiment is to require that a second vector, fixed in the payload pattern and perpendicular to the first one, be maintained perpendicular to an earth fixed vector. For example, if the payload is a vertically polarized payload pattern, the second vector is preferably a vector perpendicular to the polarization plane containing the first vector. If the second vector is kept perpendicular to the earth's spin axis, then the apparent rotation of the payload polarization seen in the service region as the satellite moves through its orbit will be kept relatively low.

The choice of what vector in the payload pattern should be chosen to be the vector locked to the target point is also worthy of discussion. In beacon track systems, where the target is a physical beacon site, and the vector in the payload pattern is a monopulse null, there are advantages to keeping the vector in the center of the payload pattern, near the boresight, since the antenna gain and directivity tend to be better here. For determining the attitude steering profile, however, it is worth considering choosing this vector to optimize the pointing metric. A numeric optimization algorithm can vary this vector azimuth and elevation as two additional parameters in addition to the three Cartesian coordinates of the target point.

To show the utility of a non-boresight first payload vector, we will show that it can be used in Table 1 to produce a pointing profile using a surface point that is much better than the best result obtainable using the center of the payload pattern as the first payload vector. In Table 1, if the payload vector were chosen by beginning with the payload vector which is aligned with the northern region extreme when the satellite lies in the orbit plane and the payload boresight lies in the equatorial plane, then rotating that northern payload vector by 0.0331 degrees to the South in the body, the result would be a first vector, which, when locked onto the northern region extreme, would produce an attitude identical to that produced by the Two Point Nodding or Subterranean target point schemes at these positions. There are several reasons to prefer the subterranean target point in this case: first, this non-boresight vector technique has an error when the satellite is in the equatorial plane, and second, the subterranean target point remains appropriate as the orbit inclination changes over life, whereas this non-boresight vector would not (consider, for example, the case of zero inclination—this non-boresight target vector has an error of 0.0331 degrees, and the other methods have no error). However, the fact that the non-boresight target vector does much better than the boresight surface target here suggests that the possibility of improving pointing by adjusting the first vector should be kept in mind. As far as the steering law is concerned, the vector chosen by the payload engineers as the boresight vector may be relatively arbitrary in the attitude control frame, and no more computations would be involved in using a different vector. It should also be borne in mind, however, that unless the improvement found by varying this vector is significant, that the value of using the same "boresight" vector as the payload area on clarifying communication between the attitude control and payload areas may be more important.

While the prior examples are for satellites in geosynchronous orbit, this invention may also be applied to non-geosynhronous orbits. For example, one approach to payload pointing in low earth orbit is the so-called "caterpillar" beam pointing, where each payload beam is projected ahead of the satellite's path to a ground region, then held relatively fixed to that ground region as the satellite passes by. Once the satellite is far enough past the ground region, the payload beam is redirected to a new region ahead of the satellite. The targeting of such beams could use a subterranean target point for each region chosen to keep the beam borders relatively ground fixed as the satellite moves through the orbit arc in which the beam is used.

Other advantages and features of the present invention will become evident to those skilled in the art upon reading the following claims.

What is claimed:

1. A method for targeting the payload beam of a satellite in a geosynchronous earth orbit toward an intended service area having known geographical dimensions, comprising the steps of:

determining a subterranean target point, the target point being at least 100 kilometers below the earth's surface and distinct from the earth center;

orienting the satellite payload toward the subterranean target point; and maintaining the payload beam orientation during orbit using an on board attitude control system.

2. The method of claim 1, wherein the payload beam includes a boresight, and further wherein the orbit inclination angle, the northern and southern region extremes of the intended service area, and the payload beam half-angle are all known, and including the additional steps of:

calculating a northern payload extreme when the satellite is in a first known orbit location;

aligning the northern payload extreme with the northern region extreme; and calculating a first subterranean point at which the satellite boresight intersects the earth equatorial plane;

calculating a southern payload extreme when the satellite is in a second known orbit location;

aligning the southern payload extreme with the southern region extreme;

calculating a second subterranean point at which the satellite boresight intersects the earth equatorial plane;

comparing the first subterranean point to the second subterranean point; and choosing the subterranean target point based on the comparison.

3. The method of claim 2, wherein the north orbit location is the northern orbit extreme and wherein the south orbit location is the southern orbit extreme.

4. The method of claim 2 wherein the subterranean target point is obtained by approximating the point of closest approach between the boresight lines extending through the first and second subterranean points.

5. The method of claim 2, including the additional steps of:

positioning the satellite at a third known orbit location;

calculating a northern payload extreme for the third location;

aligning the northern payload extreme with the northern region extreme;

calculating a third subterranean point at which the satellite boresight intersects the earth equatorial plane;

positioning the satellite at a fourth known orbit location symmetrical about an orbital mean relative to the third orbit location;

calculating a southern payload extreme for the fourth location;

aligning the southern payload extreme with the southern region extreme;

calculating a fourth subterranean point at which the satellite boresight intersects the earth equatorial plane;

optimizing the subterranean target point based on a numerical comparison of the subterranean points.

6. A method for steering the payload beam of a satellite in a non-geostationary earth orbit toward an intended service area having known geographical dimensions, comprising the steps of:

determining the position of a subterranean target point, the target point being at least 100 kilometers below the earth's surface and distinct from the earth center;

selecting a target vector fixed in the payload pattern;

determining the satellite position;

directing the target vector toward the target point; and maintaining the target vector pointing toward the target point using an on-board attitude control system.

7. The method of claim 6, wherein the satellite is in a geosynchronous orbit having an inclination angle of ten degrees or less, and wherein the position of the subterranean target point is determined by the step of:

calculating the position of the target vector when the satellite is in its preferred pointing attitude at different satellite locations within the orbit to obtain a set of target vectors; and choosing the subterranean target point at a point that minimizes a payload pointing metric over the set of target vectors.

8. The method of claim 6, including the additional steps of:

selecting a second vector fixed in the payload beam;

selecting a third vector in a direction fixed relative to the earth; and directing the target vector so that the second vector is maintained perpendicular relative to the third vector.

9. The method of claim 8, including the step of maintaining the third vector parallel to a spin axis of the earth.

10. A method for targeting the payload beam of a satellite in a geosynchronous earth orbit toward an intended service area having known geographical dimensions, the payload beam includes a boresight, and further wherein an orbit inclination angle, the northern and southern region extremes of the intended service area, and the payload beam half-angle are all known, said method comprising the steps of:

determining a subterranean target point, the target point being distinct from the earth center;

orienting the satellite payload beam toward the subterranean target point;

maintaining the payload beam orientation during orbit using an on board attitude control system;

calculating a northern payload extreme when the satellite is in a first known orbit location;

aligning the northern payload extreme with the northern region extreme;

calculating a first subterranean point at which the satellite boresight intersects the earth equatorial plane;

calculating a southern payload extreme when the satellite is in a second known orbit location;

aligning the southern payload extreme with the southern region extreme;

calculating a second subterranean point at which the satellite boresight intersects the earth equatorial plane;

comparing the first subterranean point to the second subterranean point; and choosing the subterranean target point based on the comparison.

11. The method of claim 10, wherein the north orbit location is the northern orbit extreme and wherein the south orbit location is the southern orbit extreme.

12. The method of claim 10, wherein the subterranean target point is obtained by approximating the point of closest approach between the boresight lines extending through the first and second subterranean points.

13. The method of claim 10, including the additional steps of:

positioning the satellite at a third known orbit location;

calculating a northern payload extreme for the third location;

aligning the northern payload extreme with the northern region extreme;

calculating a third subterranean point at which the satellite boresight intersects the earth equatorial plane;

positioning the satellite at a fourth known orbit location symmetrical about an orbital mean relative to the third orbit location;

calculating a southern payload extreme for the fourth location;

aligning the southern payload extreme with the southern region extreme;

calculating a fourth subterranean point at which the satellite boresight intersects the earth equatorial plane; and optimizing the subterranean target point based on a numerical comparison the subterranean points.

14. A method for steering the payload beam of a satellite in a non-geostationary earth orbit toward an intended service area having known geographical dimensions, wherein the satellite is in a geosynchronous orbit having an inclination angle of ten degrees or less, the method comprising the steps of:

determining the position of a subterranean target point, the target point being at least 100 kilometers below the earth's surface and distinct from the earth center and wherein said step of determining the position of the subterranean target point further comprises the steps of:

calculating the position of the target vector when the satellite is in its preferred pointing attitude at different satellite locations within the orbit to obtain a set of target vectors; and choosing the subterranean target point at a point that minimizes a payload pointing metric over the set of target vectors;

selecting a target vector fixed in the payload pattern;

determining the satellite position;

directing the target vector toward the target point; and maintaining the target vector pointing toward the target point using an on-board attitude control system.

15. The method of claim 14, including the additional steps of:

selecting a second vector fixed in the payload beam;

selecting a third vector in a direction fixed relative to the earth; and directing the target vector so that the second vector is maintained perpendicular relative to the third vector.

16. The method of claim 15, including the step of maintaining the third vector parallel to a spin axis of the earth.

* * * * *